United States Patent
Hannemann et al.

[11] Patent Number: 5,850,846
[45] Date of Patent: Dec. 22, 1998

[54] HANDLE ASSEMBLY FOR SINGLE-CONTROL VALVE

[75] Inventors: Fred Hannemann, Herzberg; Roland Weiss, Iserlohn, both of Germany

[73] Assignee: Friedrich Grohe AG, Hemer, Germany

[21] Appl. No.: 798,621

[22] Filed: Feb. 11, 1997

[30] Foreign Application Priority Data

Mar. 6, 1996 [DE] Germany .................. 196 08 594.2

[51] Int. Cl.⁶ .................................................. F16K 11/02
[52] U.S. Cl. .................. 137/315; 137/625.4; 251/291; 16/114 R; 16/DIG. 24
[58] Field of Search ............... 137/625.17, 625.4, 137/625.41, 636.2, 636.3, 636.4, 315; 251/291; 116/14 R, 123, 121, DIG. 24, DIG. 30

[56] References Cited

U.S. PATENT DOCUMENTS

| | | | |
|---|---|---|---|
| 3,250,148 | 5/1966 | Soles ........................................ | 16/121 |
| 3,301,580 | 1/1967 | Greitzer . | |
| 3,791,402 | 2/1974 | Shuler ..................................... | 16/121 X |
| 4,065,216 | 12/1977 | Nelson .................................... | 16/121 X |
| 4,479,736 | 10/1984 | Evans et al. ........................... | 16/114 R X |
| 4,525,894 | 7/1985 | Knapp ................................... | 16/114 R X |
| 4,783,885 | 11/1988 | Bory ....................................... | 16/121 X |
| 4,829,632 | 5/1989 | Freier et al. ........................... | 16/114 R |
| 4,876,766 | 10/1989 | Cohen .................................... | 16/121 X |
| 4,971,113 | 11/1990 | Pawelzik et al. ...................... | 137/625.17 |
| 5,337,450 | 8/1994 | Martin .................................... | 16/121 X |
| 5,778,489 | 7/1998 | Marshal, II ............................ | 16/114 R |

FOREIGN PATENT DOCUMENTS

| | | | |
|---|---|---|---|
| 0282775 | 9/1988 | European Pat. Off. . | |
| 0470647 | 2/1992 | European Pat. Off. . | |
| 1344990 | 10/1962 | France ................................ | 137/625.4 |
| 2808349 | 9/1979 | Germany . | |
| 8704009 | 6/1987 | Germany . | |
| 4343572 | 6/1995 | Germany . | |
| 903175 | 8/1962 | United Kingdom .................... | 16/121 |

*Primary Examiner*—John Rivell
*Assistant Examiner*—Meredith H. Schoenfeld
*Attorney, Agent, or Firm*—Herbert Dubno; Andrew Wilford

[57] ABSTRACT

A single-control valve having a valve housing and a stem projecting along a stem axis from the housing and displaceable relative to the housing to control flow through the valve has a handle assembly having a handle body having an actuating arm, a cup-shaped part spacedly surrounding the stem and projecting toward the valve housing, and a mounting collar fittable snugly over the stem. An annular cover skirt us supported on the body by interengaging formations for displacement of the skirt relative to the body between an access position forming with the body an access hole and a use position closely snugly juxtaposed with the body and closing the hole. A fastener engaged is in the collar with the stem and accessible through the hole by a tool only in the access position of the skirt. The fastener is hidden by the skirt in the use position.

11 Claims, 2 Drawing Sheets

5,850,846

HANDLE ASSEMBLY FOR SINGLE-CONTROL VALVE

FIELD OF THE INVENTION

The present invention relates to a single-control valve. More particularly this invention concerns a handle assembly for such a valve.

BACKGROUND OF THE INVENTION

A standard single-control valve has a valve housing and a stem projecting along a stem axis from the housing and displaceable relative to the housing to control flow through the valve. Normally this stem is rotated about its axis to control temperature and is tipped about an axis perpendicular to the stem axis to control volume of flow. A handle assembly sits on this stem and comprises a handle body having an actuating arm, a cup-shaped part spacedly surrounding the stem and projecting toward the valve housing, and a mounting collar fittable snugly over the stem. A fastener, normally a small set screw, is engaged in the collar with the stem and actuatable by a tool to lock the handle assembly on the stem.

As described in German patent document 4,343,572 of Graf, the cover part is formed under the handle with a downwardly open hole in line with the fastener. Thus a screwdriver or hex wrench can be inserted through this hole, which is generally out of sight, to allow access to the fastener for mounting or dismounting the handle assembly.

This access hole for the retaining fastener is considered unattractive, as it is fully visible in the raised maximum-volume setting of the handle. In addition water and dirt can get into this hole, fouling the underlying structure and making the fastener hard to operate.

OBJECTS OF THE INVENTION

It is therefore an object of the present invention to provide an improved handle assembly for a single-control valve.

Another object is the provision of such an improved handle assembly for a single-control valve which overcomes the above-given disadvantages, that is which presents an attractive appearance with no apertures that water or dirt can get into.

SUMMARY OF THE INVENTION

A single-control valve having a valve housing and a stem projecting along a stem axis from the housing and displaceable relative to the housing to control flow through the valve has according to the invention a handle assembly having a handle body having an actuating arm, a cup-shaped part spacedly surrounding the stem and projecting toward the valve housing, and a mounting collar fittable snugly over the stem. An annular cover skirt is supported on the body by interengaging formations for displacement of the skirt relative to the body between an access position forming with the body an access hole and a use position closely snugly juxtaposed with the body and closing the hole. A fastener is engaged in the collar with the stem and accessible through the hole by a tool only in the access position of the skirt. The fastener is hidden by the skirt in the use position.

Thus with this system the access hole is completely gone when the skirt is in the use position. The appearance of the assembly is therefore excellent while it is still possible to open up the access hole and tighten or loosen the fastener.

According to the invention the cup-shaped part and the skirt are both centered on an axis and the skirt is displaceable axially between its positions. In addition the formations include axially extending and radially deflectable fingers on the skirt and radially open and axially spaced grooves on the part in which the fingers are engageable. The grooves are radially inwardly open and the fingers each have a radially outwardly directed bump engageable in the grooves. In accordance with the invention the skirt has three such angularly generally equispaced fingers.

According to another feature of the invention the skirt has at least two axially extending fingers engageable in complementary axially extending grooves on the part which snugly receive the fingers and impede rotation of the skirt relative to the part. The skirt has two such diametrically opposed fingers and the part has two such diametrically opposed grooves.

The skirt according to another feature of the invention is provided with a plurality of decorative rings snugly engaged between the skirt and the part in the use position. The skirt is made of plastic and the fastener is a screw threaded in the collar. The handle body is made of metal.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
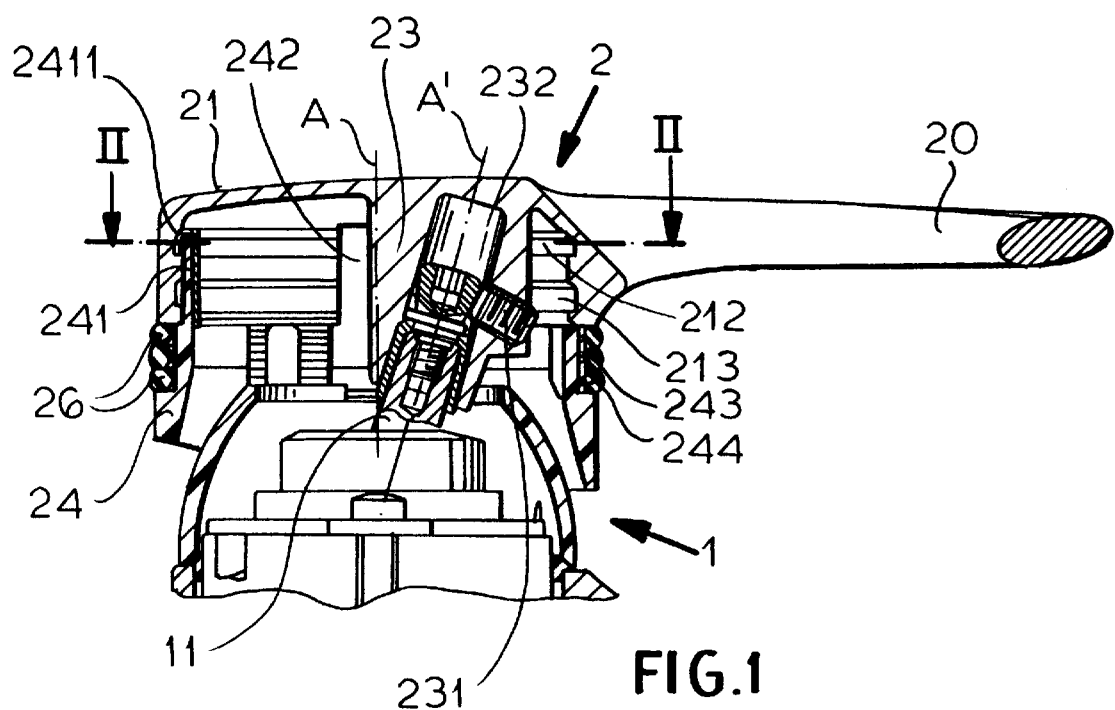
FIG. 1 is a side view partly in axial section through the valve and handle assembly according to the invention.
Figure 2:
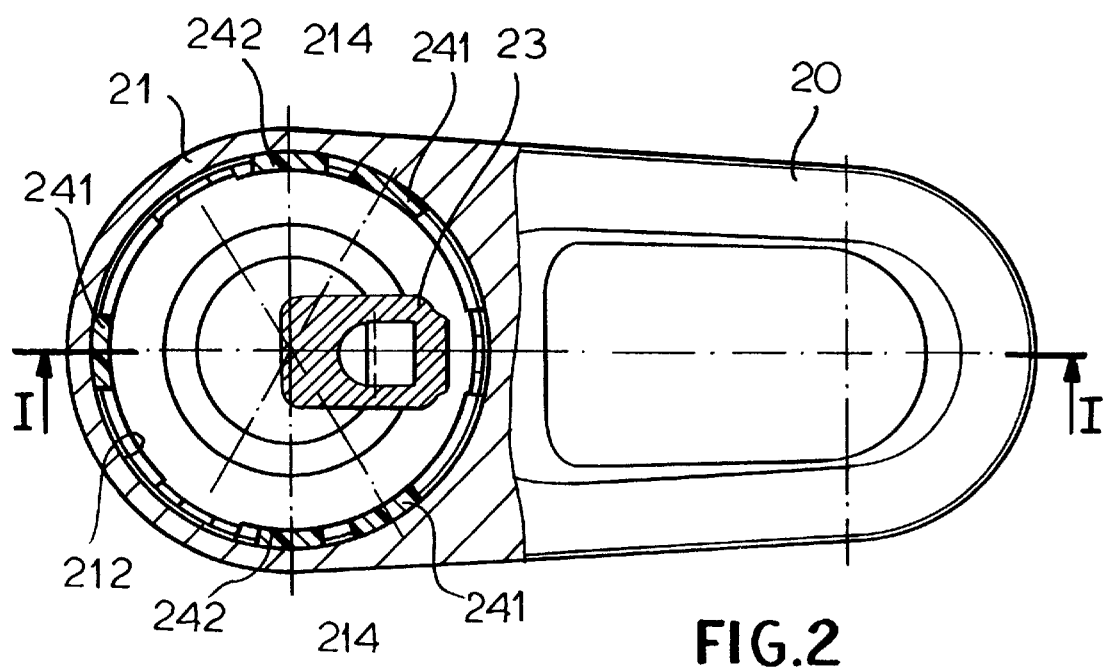
FIG. 2 is a section taken along line II—II of FIG. 1, line I—I indicating the section plane of FIG. 1.

As seen in FIGS. 1 and 2, a valve 1 according to this invention has a standard metallic stem 11 centered on an axis A'. This stem 11 is typically tipped about a horizontal axis intersecting its axis A' to control the volume of flow through the valve 1 and is pivoted about its axis A' to control the temperature of the outputted water.

A handle assembly 2 comprises a loop-shaped handle 20 extending from a cup-shaped cover 21 and formed integrally with a central collar 23 having a bore or seat 232 that fits complementarily over the stem 11. A hex screw 231 threaded in the wall of the collar 23 can bear generally radially of the axis A' on the stem 11 to lock the handle assembly 2 on the stem 11 so that same can be operated by the handle 20.

A decorative cover skirt 24 made of plastic is of generally cylindrically tubular shape and is formed with, relative to an axis A of the cup-shaped cover part 21 of the handle assembly 2, three axially extending and angularly equispaced fingers 241. At their outer ends these fingers 241 each have a radially outwardly projecting bump 2411 that can engage in either a radially inwardly upper groove 212 or a similar lower groove 213 formed in the inside surface of the cup-shaped cover part 21. Three decorative rings 26 surround the skirt 24 and sit in a recess 243 on a shoulder 244 thereof. In addition the cover skirt 24 is formed with two diametrally opposite axially extending guide fingers 242 received in complementary grooves 214 of the cover part 21 so that the skirt 24 can move axially on the part 21 but cannot rotate relative thereto about the axis A.

Figure 3:
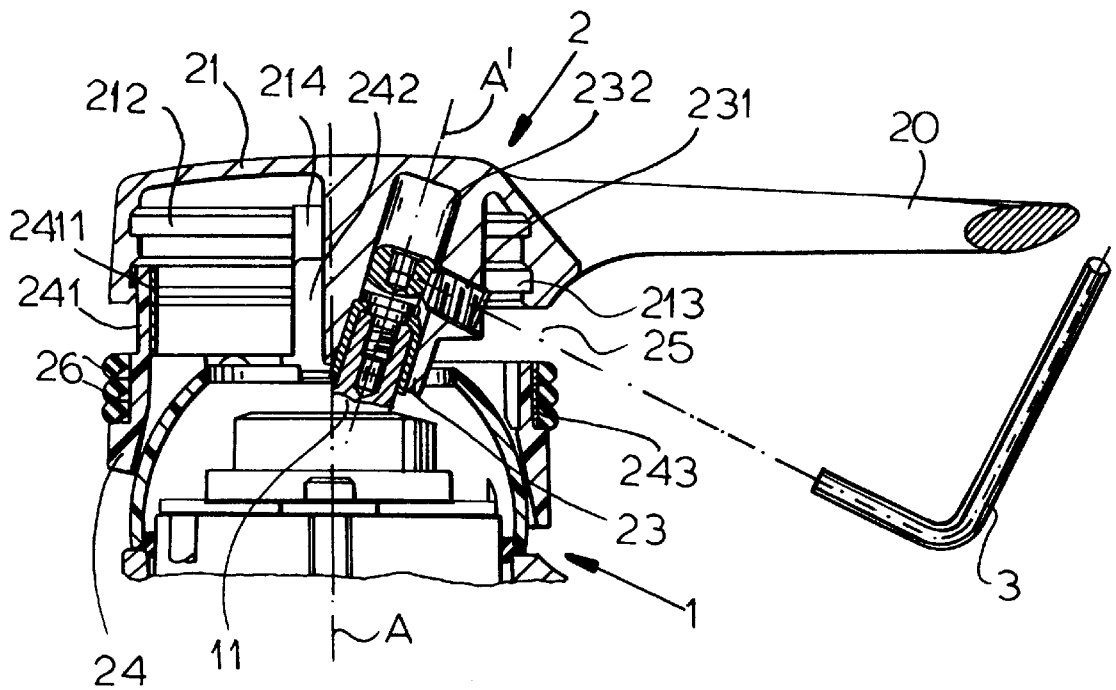
FIG. 3 is a view like FIG. 1 but with the cover skirt dripped into the access position.
Figure 4:
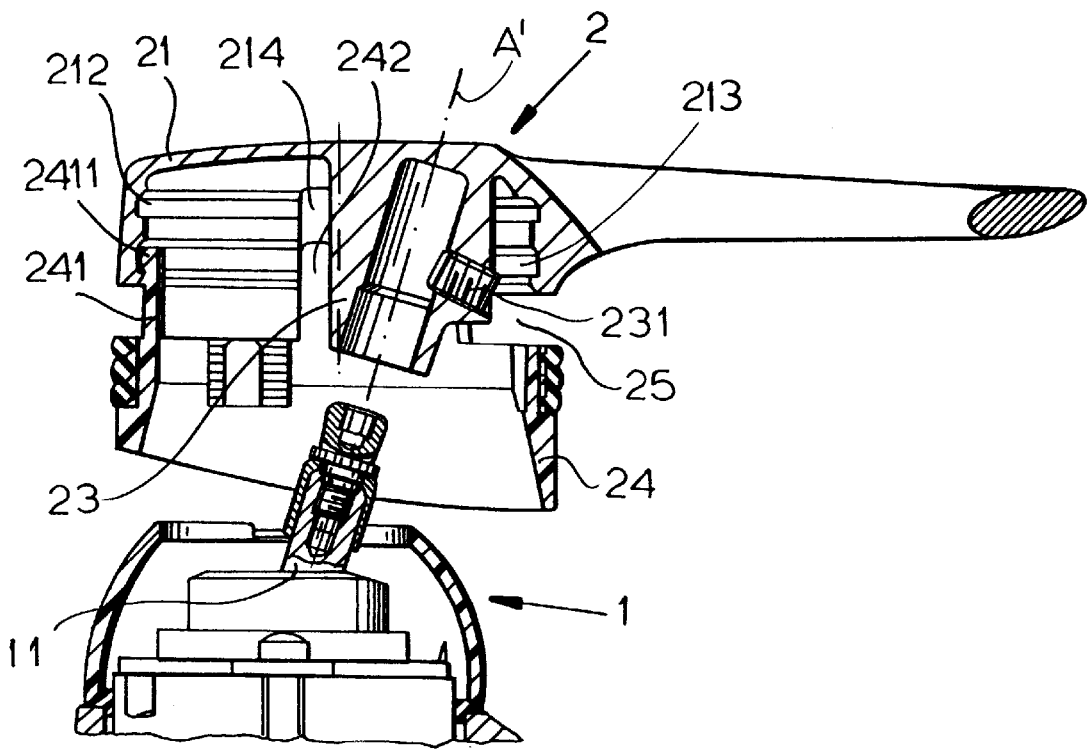
FIG. 4 is a view like FIG. 3 but with the handle assembly separated from the valve.

Thus the skirt 24 and its rings 26 are displaceable between the normal use position shown in FIG. 1 with the rings 26 fitted between the shoulder 244 and the lower edge of the part 21 and the lower access position of FIGS. 3 and 4 in which it forms a space 23 through which a tool 3, here a hex key, can be engaged to tighten or loosen the screw 231. In use therefore the skirt absolutely hides the screw 231 and other structure underneath the part 21, presenting an extremely attractive appearance that can be augmented by appropriate selection of the color and finish of the skirt 24 and rings 26.

In order to install the handle assembly 2 the skirt 24 is fitted to it with the bumps 2411 engaged in the lower groove 213. Then it is fitted as shown in FIG. 3 to the stem 11 and the wrench 3 is engaged through the hole 25 to tighten the screw 231. Once tightened, the tool 3 is removed and the skirt 24 is pushed up to engage the bumps 2411 in the upper groove 212. To remove the handle these steps are reversed.

Instead of the fingers 241 and grooves 212 and 213, it is possible to form outer surfaces of the fingers 241 with sections of a screwthread mating with a complementary such screw-thread inside the cover part 21. Thus the skirt 24 would be screwed down into and back up out of the access position. Alternately J- or L-shaped grooves could be provided in the cover part 21 to accommodate the bumps 2411 like a bayonet coupling. Either system entailing relative rotation of the skirt 24 on the handle part 21 has the modest disadvantage that engagement of the skirt 24 with the valve 1 during use could loosen the skirt 24.

We claim:

1. In combination
    a single-control valve having
        a valve housing and
        a stem projecting along a stem axis from the housing and displaceable relative to the housing to control flow through the valve; and
    a handle assembly comprising:
        a handle body having
            an actuating arm,
            a cup-shaped part spacedly surrounding the stem and projecting toward the valve housing, and
            a mounting collar fittable snugly over the stem;
        an annular cover skirt;
        interengaging formations on the skirt and body supporting the skirt on the body for displacement of the skirt relative to the body between an access position forming with the body an access hole and a use position closely snugly juxtaposed with the body; and
    means including a fastener engaged in the collar with the stem and accessible through the hole by a tool only in the access position of the skirt, the fastener being hidden by the skirt in the use position.

2. The combination defined in claim 1 wherein the cup-shaped part and the skirt are both centered on an axis and the skirt is displaceable axially between its positions.

3. The combination defined in claim 2 wherein the formations include
    axially extending and radially deflectable fingers on the skirt and
    radially open and axially spaced grooves on the part in which the fingers are engageable.

4. The combination defined in claim 3 wherein the grooves are radially inwardly open and the fingers each have a radially outwardly directed bump engageable in the grooves.

5. The combination defined in claim 4 wherein the skirt has three such angularly generally equispaced fingers.

6. The combination defined in claim 2 wherein the formations include
    axially extending fingers on the skirt, and
    axially extending grooves on the part snugly receiving the fingers and impeding rotation of the skirt relative to the part.

7. The combination defined in claim 6 wherein the skirt has two such diametrically opposed fingers and the part has two such diametrically opposed grooves.

8. The combination defined in claim 2 wherein the skirt is provided with a plurality of decorative rings snugly engaged between the skirt and the part in the use position.

9. The combination defined in claim 2 wherein the skirt is made of plastic.

10. The combination defined in claim 1 wherein the fastener is a screw threaded in the collar.

11. The combination defined in claim 10 wherein the handle body is made of metal.

* * * * *